United States Patent
Yang et al.

(10) Patent No.: US 8,645,753 B2
(45) Date of Patent: Feb. 4, 2014

(54) POWER SYSTEM WITH HOT-SWAP AND THE METHOD THEREOF

(75) Inventors: Eric Yang, Saratoga, CA (US); ZhengXing Li, Hangzhou (CN); Yuancheng Ren, Hangzhou (CN)

(73) Assignee: Monolithic Power Systems, Inc., San Jose, CA (US)

( * ) Notice: Subject to any disclaimer, the term of this patent is extended or adjusted under 35 U.S.C. 154(b) by 220 days.

(21) Appl. No.: 13/335,643

(22) Filed: Dec. 22, 2011

(65) Prior Publication Data

US 2013/0166947 A1 Jun. 27, 2013

(51) Int. Cl.
*G06F 11/00* (2006.01)
(52) U.S. Cl.
USPC .............................. 714/14; 714/30
(58) Field of Classification Search
USPC .......... 714/14, 22, 30, 31, 733, 734; 323/205, 323/210
See application file for complete search history.

(56) References Cited

U.S. PATENT DOCUMENTS

| | | | |
|---|---|---|---|
| 7,786,709 B2* | 8/2010 | Lawson et al. | 323/206 |
| 2006/0100739 A1* | 5/2006 | Raffle et al. | 700/245 |
| 2009/0167087 A1* | 7/2009 | Clemo et al. | 307/43 |
| 2009/0206670 A1* | 8/2009 | Whitted et al. | 307/64 |
| 2013/0147449 A1* | 6/2013 | Lawson et al. | 323/282 |

OTHER PUBLICATIONS

U.S. Appl. No. 13/051,360, filed Mar. 18, 2011, Monolithic Power Systems.
U.S. Appl. No. 13/090,082, filed Apr. 19, 2011, Monolithic Power Systems.
U.S. Appl. No. 13/288,536, filed Nov. 3, 2011, Monolithic Power Systems.

* cited by examiner

*Primary Examiner* — Dieu-Minh Le
(74) *Attorney, Agent, or Firm* — Perkins Coie LLP

(57) ABSTRACT

The present disclosure discloses a power system with hot-swap with a buck converter. The power system comprises a front stage, a hot-swap stage and a load stage; wherein the hot-swap stage comprises: a buck converter having a switch operate at ON/OFF state to provide a desired output voltage to the load stage with low power loss and optimized thermal design.

20 Claims, 6 Drawing Sheets

FIG. 10

POWER SYSTEM WITH HOT-SWAP AND THE METHOD THEREOF

TECHNICAL FIELD

The present disclosure relates to electronic circuits, more particularly, the present disclosure relates to circuits with hot-swap.

BACKGROUND

Hot-swap is a useful function for inserting a hard disk drive, an interface card into a system, and removing a device from the system when the system is hot without doing harm to the system. Prior art uses a FET as a hot-swap, which operates as a LDO (low dropout) at start-up, as shown in FIG. 1a.

Figure 1A:
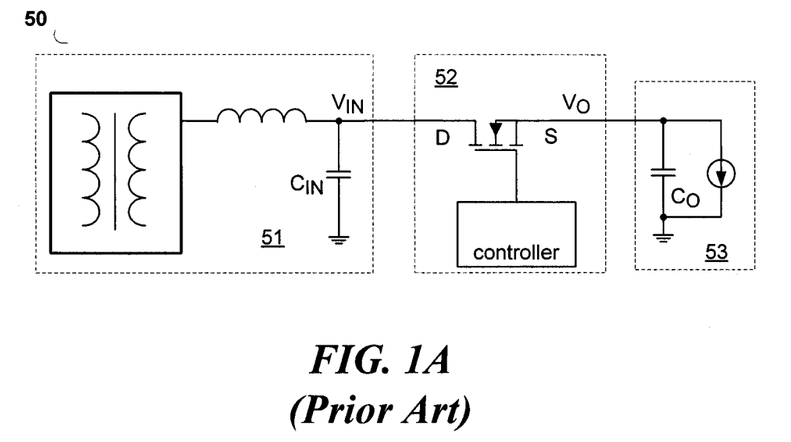
FIG. 1A illustrates a schematic circuit of a prior art power system 50 with hot-swap.

FIG. 1a schematically shows a prior art power system 50 with hot-swap. The power system 50 comprises: a front stage 51 including a front capacitor $C_{IN}$, wherein the front stage 51 is configured to provide a power supply $V_{IN}$; a hot-swap stage 52 coupled to the front stage 51 to receive the power supply $V_{IN}$, and to provide an output voltage $V_O$ based thereupon; and a load stage 53 including an output capacitor $C_O$ coupled to the hot-swap stage 52 to receive the output voltage $V_O$. Typically, the hot-swap stage 52 and the load stage 53 are placed at a board. In the example of FIG. 1a, the hot-swap stage 52 comprises a MOSFET and a controller, wherein the MOSFET is controlled to operate at LDO mode by the controller when the board is plugged to the front stage 51 (i.e., at start-up), to generate the output voltage $V_O$ with gradual increase from zero.

Figure 1B:
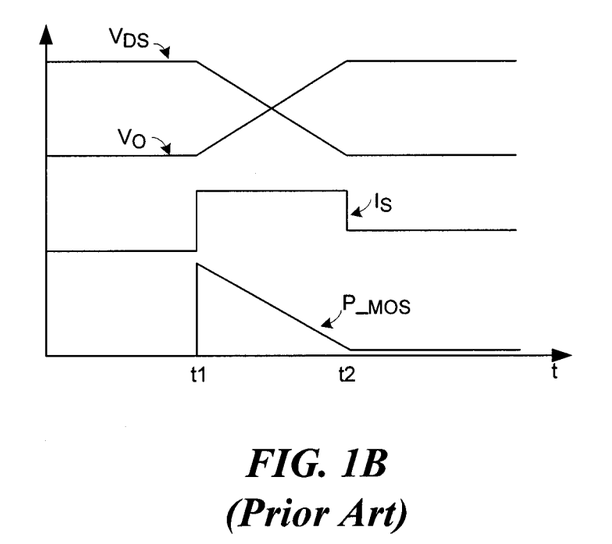

FIG. 1b schematically shows the waveforms of the output voltage $V_O$, a voltage drop of the MOSFET $V_{DS}$, a current flowing through the MOSFET $I_S$, and the power of the MOSFET $P\_{MOS}$ in the hot-swap system 50 in FIG. 1a. Since the MOSFET operates at LDO mode, the output voltage $V_O$ increases gradually from zero to the input voltage value minus the saturated voltage drop of the MOSFET. However, the power supply $V_{IN}$ is constant, so the voltage drop of the MOSFET $V_{DS}$ decreases gradually from the value of the power supply to its saturated voltage. In addition, during the start-up of the plugging of the board, the load stage 53 operates as a current source to sink the current, while the current flowing through the MOSFET includes both the load current and the current flowing through the output capacitor $C_O$. Thus, the MOSFET consumes a large power loss. Although this power loss is minor since the start-up time is short in the whole operation of the power system, the thermal design has to follow the power loss condition of start-up. Normally, for high current application, several MOSFETs and large board space for thermal dissipation are required. So it is thermally over-design due to this large power loss at start-up compared to the system operates at steady status for most of time.

SUMMARY

It is an object of the present disclosure to provide a power system with hot-swap, which solves the above problems.

In accomplishing the above and other objects, there has been provided, in accordance with an embodiment of the present disclosure, a power system with hot-swap, comprising: a front stage having an output terminal configured to provide a constant power supply, wherein the front stage having a front capacitor coupled between the output terminal and a reference ground; a hot-swap stage coupled to the output terminal of the front stage to receive the power supply, and to generate an output voltage based thereupon; wherein the hot-swap stage comprises: a buck converter having a switch; and a controller having a first input terminal, a second input terminal, and an output terminal, wherein the first input terminal is configured to receive a current sense signal indicative of a current flowing through the switch, the second input terminal is configured to receive a voltage feedback signal indicative of the output voltage, and wherein based on the current sense signal and the voltage feedback signal, the controller generates a switch control signal at the output terminal, to control the switch to operate at ON/OFF state, and wherein the hot-swap stage generates the output voltage with desired voltage value based on the ON/OFF operation of the switch; and a load stage coupled to the hot-swap stage to receive the output voltage.

In addition, there has been provided, in accordance with an embodiment of the present disclosure, a power supply with hot-swap, comprising: a front stage having an output terminal configured to provide a constant power supply, wherein the front stage having a front capacitor coupled between the output terminal and a reference ground; a hot-swap stage coupled to the output terminal of the front stage to receive the power supply, and to generate an output voltage based thereupon; wherein the hot-swap stage comprises: a switch having a first terminal, a second terminal and a control terminal, wherein the first terminal is coupled to the output terminal of the front stage to receive the power supply; a diode coupled between the second terminal of the switch and the reference ground; an inductor having a first terminal and a second terminal, wherein the first terminal is coupled to the second terminal of the switch, and wherein the output voltage is provided at the second terminal of the inductor; and a controller having a first input terminal, a second input terminal, and an output terminal, wherein the first input terminal is configured to receive a current sense signal indicative of a current flowing through the switch, the second input terminal is configured to receive a voltage feedback signal indicative of the output voltage, and based on the current sense signal and the voltage feedback signal, the controller generates a switch control signal to the control terminal of the switch at its output terminal, to control the switch to operate at ON/OFF state, and wherein the hot-swap stage generates the output voltage with desired voltage value based on the ON/OFF operation of the switch; and a load stage coupled to the hot-swap stage to receive the output voltage.

Furthermore, there has been provided, in accordance with an embodiment of the present disclosure, a method for hot swapping, comprising: placing a hot-swap stage and a load stage at a board, wherein the hot-swap stage comprises a buck converter including a switch operating at ON/OFF state; plugging the board to a power system; controlling the switch operate at ON/OFF state to provide an output voltage at an output terminal of the hot-swap stage; wherein the switch has a duty cycle gradually increasing from 0% to 100% during the plugging; and wherein the duty cycle keeps 100% after the plugging process is completed and during the normal operation of the power system.

BRIEF DESCRIPTION OF THE DRAWINGS

FIG. 1B schematically shows the waveforms of the output voltage $V_O$, a voltage drop of the MOSFET $V_{DS}$, a current flowing through the MOSFET $I_S$, and the power of the MOSFET in the power system 50 in FIG. 1a.

The use of the same reference label in different drawings indicates the same or like components.

DETAILED DESCRIPTION

Embodiments of circuits for power system with hot-swap are described in detail herein. In the following description, some specific details, such as example circuits for these circuit components, are included to provide a thorough understanding of embodiments of the disclosure. One skilled in relevant art will recognize, however, that the disclosure can be practiced without one or more specific details, or with other methods, components, materials, etc. . . .

The following embodiments and aspects are illustrated in conjunction with circuits and methods that are meant to be exemplary and illustrative. In various embodiments, the above problem has been reduced or eliminated, while other embodiments are directed to other improvements.

The present disclosure relates to circuits and methods of power system with hot-swap.

Figure 2:
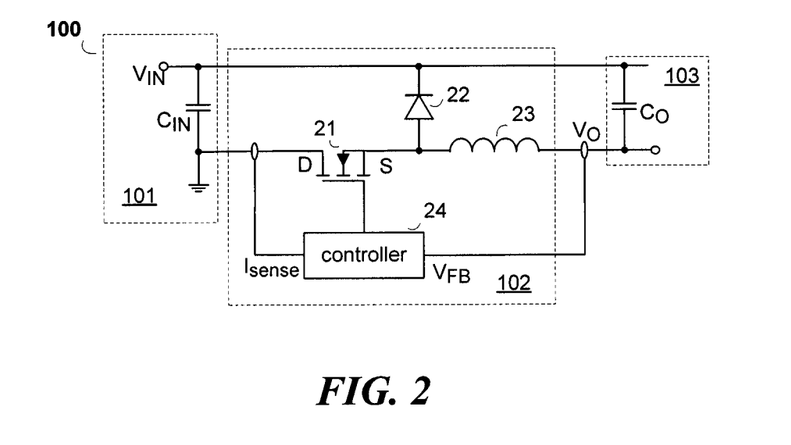
FIG. 2 illustrates a schematic circuit of a power system 100 with hot-swap in accordance with an embodiment of the present disclosure.

FIG. 2 illustrates a schematic circuit of a power system 100 with hot-swap in accordance with an embodiment of the present disclosure. In the example of FIG. 2, the power system 100 comprises: a front stage 101 having an output terminal configured to provide a constant power supply $V_{IN}$, wherein the front stage 101 having a front capacitor $C_{IN}$ coupled between the output terminal and a reference ground; a hot-swap stage 102 coupled to the output terminal of the front stage 101 to receive the power supply $V_{IN}$, and to generate an output voltage $V_O$ based thereupon, wherein the hot-swap stage 102 comprises: a buck converter having a switch 21; and a controller 24 having a first input terminal, a second input terminal, and an output terminal, wherein the first input terminal is configured to receive a current sense signal indicative of a current flowing through the switch 21, the second input terminal is configured to receive a voltage feedback $V_{FB}$ signal indicative of the output voltage $V_O$, and wherein based on the current sense signal and the voltage feedback signal $V_{FB}$, the controller 24 generates a switch control signal at the output terminal, to control the switch 21 to operate at ON/OFF state, and further wherein the hot-swap stage 102 generates the output voltage $V_O$ with desired voltage value based on the ON/OFF operation of the switch 21; and a load stage 103 coupled to the hot-swap stage 102 to receive the output voltage $V_O$.

In one embodiment, the desired output voltage value is substantially equal to the voltage value of the power supply $V_{IN}$.

In the example of FIG. 2, the buck converter further comprises: a diode 22 coupled to the switch 21; and an inductor 23 having a first terminal and a second terminal, wherein the first terminal is coupled to the conjunction of the switch 21 and the diode 22, wherein the output voltage $V_O$ is provided at the second terminal of the inductor 23.

In one embodiment, the switch 21 comprises a MOSFET, but one skilled in the art should realize that the switch 21 may comprise other types of controllable semiconductor device, such as IGBT, BJT, etc. . . .

In one embodiment, the load stage comprises telecom line cards, network switches/routers, central-office line cards, server line cards, base-station line cards, and etc. . . .

In one embodiment, the power supply $V_{IN}$ has a voltage value of 48 Volts or 12 Volts, which is the typical voltage value of a telecom line cards.

Figure 3:
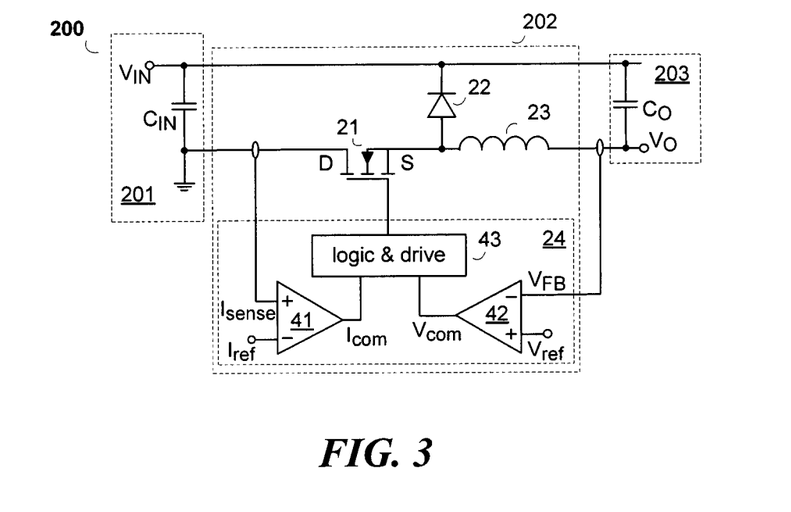
FIG. 3 illustrates a schematic circuit of a power system 200 with hot-swap with a controller 24 in accordance with an embodiment of the present disclosure.

FIG. 3 illustrates a schematic circuit of a power system 200 with hot-swap with a controller 24 in accordance with an embodiment of the present disclosure. In the example of FIG. 3, the controller 24 comprises: a current comparator 41 having a first input terminal, a second input terminal and an output terminal, wherein the first input terminal is configured to receive the current sense signal $I_{sense}$ indicative of the current flowing through the switch 21, the second input terminal is configured to receive a current reference signal $I_{ref}$, and wherein based on the current sense signal $I_{sense}$ and the current reference signal $I_{ref}$, the current comparator 41 generates a current comparison signal $I_{com}$ at the output terminal to ensure the current flowing through the switch do not exceed a preset current value, i.e., to ensure the current sense signal follow the current reference signal $I_{ref}$; an error amplifier 42 having a first input terminal, a second input terminal and an output terminal, wherein the first input terminal is configured to receive the voltage feedback signal $V_{FB}$, the second input terminal is configured to receive a voltage reference signal $V_{ref}$ and wherein based on the voltage feedback signal $V_{FB}$ and the voltage reference signal $V_{ref}$, the error amplifier 42 generates an error amplified signal $V_{com}$ at the output terminal to ensure the feedback signal follow the voltage reference signal $V_{ref}$; and a logic and drive unit 43 having a first input terminal, a second input terminal, and an output terminal, wherein the first input terminal is coupled to the output terminal of the current comparator 41 to receive the current comparison signal $I_{com}$, the second input terminal is coupled to the output terminal of the error amplifier 42 to receive the error amplified signal $V_{com}$, and wherein based on the current comparison signal $I_{com}$ and the error amplified signal $V_{com}$, the logic and drive unit 43 generates the switch control signal at the output terminal to control the switch 21 to operate at ON/OFF state.

In one embodiment, the voltage feedback signal $V_{FB}$ is delivered to the first input terminal of the error amplifier 42 via a pre-amplifier unit (not shown).

In one embodiment, the voltage reference signal $V_{ref}$ is variable. In one embodiment, the time derivative of the voltage reference signal $V_{ref}$ is substantially zero when the output voltage $V_O$ reaches the voltage value of the power supply $V_{IN}$, i.e., $$\frac{dV_{ref}}{dt} \approx 0.$$

Figure 4:
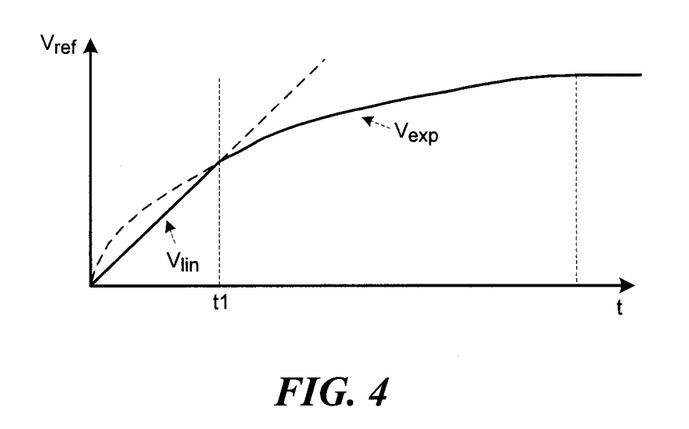
FIG. 4 schematically shows the waveform of the voltage reference signal $V_{ref}$ in the power system 200 in FIG. 3.

In one embodiment, the output voltage $V_O$ has a linear slew rate at beginning and an exponential ramping slew rate from a certain time point t1, as shown in FIG. 4.

Figure 5:
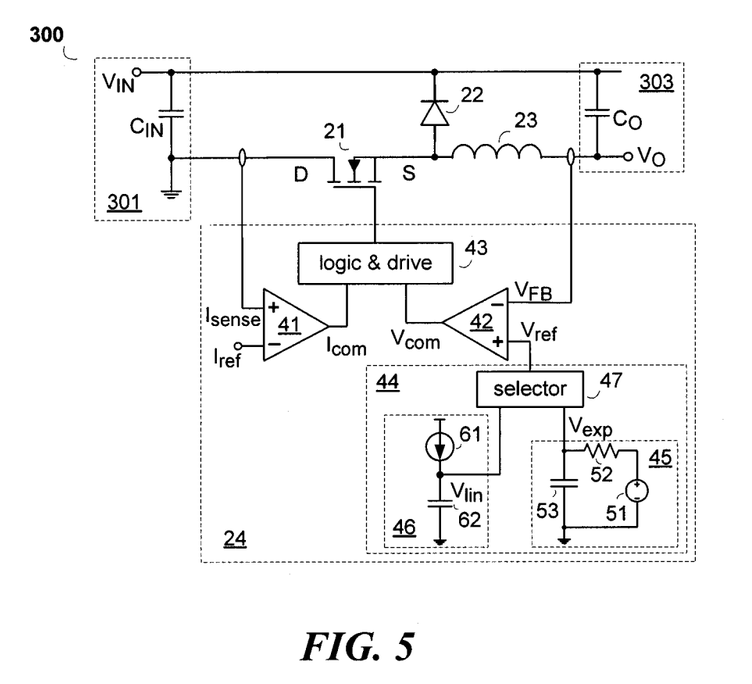
FIG. 5 illustrates a schematic circuit of a power system 300 with hot-swap with a controller 24 in accordance with an embodiment of the present disclosure.

FIG. 5 illustrates a schematic circuit of a power system 300 with hot-swap with a controller 24 in accordance with an embodiment of the present disclosure. In the example of FIG. 5, the controller 24 comprises: a current comparator 41 having a first input terminal, a second input terminal and an output terminal, wherein the first input terminal is configured to receive the current sense signal $I_{sense}$, the second input terminal is configured to receive a current reference signal $I_{ref}$, and wherein based on the current sense signal $I_{sense}$ and the current reference signal $I_{ref}$, the current comparator 41 generates a current comparison signal $I_{com}$ at the output terminal; a voltage reference generator 44 having an output terminal configured to provide a voltage reference signal $V_{ref}$ having a linear slew rate at beginning and an exponential ramping slew rate from a certain time point; an error amplifier 42 having a first input terminal, a second input terminal and an output terminal, wherein the first input terminal is configured to receive the voltage feedback signal $V_{FB}$, the second input terminal is coupled to the output terminal of the voltage reference generator 44 to receive the voltage reference signal $V_{ref}$, and wherein based on the voltage feedback signal $V_{FB}$ and the voltage reference signal $V_{ref}$, the error amplifier 42 generates an error amplified signal $V_{com}$ at the output terminal; and a logic and drive unit 43 having a first input terminal, a second input terminal, and an output terminal, wherein the first input terminal is coupled to the output terminal of the current comparator 41 to receive the current comparison signal $I_{com}$, the second input terminal is coupled to the output terminal of the error amplifier 42 to receive the error amplified signal $V_{com}$, and wherein based on the current comparison signal $I_{com}$ and the error amplified signal $V_{com}$, the logic and drive unit 43 generates the switch control signal at the output terminal to control the switch 21 to operate at ON/OFF state.

In the example of FIG. 5, the voltage reference generator 45 comprises: an exponential signal generator 45 having an output terminal configured to generate an exponential signal $V_{exp}$ with exponential ramping slew rate; a linear signal generator 46 having an output terminal configured to generate a linear signal $V_{lin}$ with linear slew rate; and a selector 47 having a first input terminal, a second input terminal and an output terminal, wherein the first input terminal is coupled to the output terminal of the exponential signal generator 45 to receive the exponential signal $V_{exp}$, the second input terminal is coupled to the output terminal of the linear signal generator 46 to receive the linear signal $V_{lin}$, and wherein based on the exponential signal $V_{exp}$ and the linear signal $V_{lin}$, the selector 47 selects the one with lower voltage value as the voltage reference signal at the output terminal.

In one embodiment, the exponential signal generator 45 comprises: a first capacitor 53 coupled between the output terminal of the exponential signal generator 45 and the reference ground; a voltage source 51 and a resistor 52 coupled in series between the output terminal of the exponential signal generator 45 and the reference ground. In one embodiment, the voltage provided by the voltage source 51 is related to the desired output voltage value.

In one embodiment, the linear signal generator 46 comprises: a current source 61 configured to provide a current signal; and a second capacitor 62 coupled between the current source 61 and the reference ground to get charged by the current source 61; wherein the conjunction of the current source 61 and the second capacitor 62 acts as the output terminal of the linear signal generator 46 to provide the linear signal $V_{lin}$.

When the load stage is plugged, the power system 300 starts to operate. In one hand, the first capacitor 62 is charged by the current source 61, and the voltage across the first capacitor 62 increase linearly. In the other hand, the second capacitor 53 is charged by the voltage source 51 and the resistor 52, so the voltage across the capacitor, i.e., the voltage of the voltage reference signal $V_{ref}$ and the voltage provided by the voltage source 51 meet a following relationship:

$$V_{ref} + C_{53} \times \frac{dV_{ref}}{dt} \times R_{52} = V_{51} \quad (1)$$

$$\Rightarrow V_{ref} = V_{51} - V_{51} \times e^{-\frac{t}{C_{53} \times R_{52}}}$$

Wherein $C_{53}$ represents the capacitance of the capacitor 53, $R_{52}$ represents the resistance of the resistor 52, $$\frac{dV_{ref}}{dt}$$

represents the time derivative of the voltage of the voltage reference signal $V_{ref}$, and $V_{51}$ represents the voltage provided by the voltage source 51. Above equation (1) shows that the voltage reference signal $V_{ref}$ has an exponential ramping slew rate.

As shown in FIG. 4, at the beginning, the slew rate of linear signal $V_{lin}$ is lower than that of the exponential signal $V_{exp}$, so the linear signal $V_{lin}$ is lower than the exponential signal $V_{exp}$. Accordingly, the linear signal $V_{lin}$ is selected to be voltage reference signal $V_{ef}$. However, as shown in FIG. 4, the exponential signal $V_{exp}$ goes lower than the linear signal $V_{lin}$ from time point t1, so the exponential signal $V_{exp}$ is selected to be the voltage reference signal $V_{ref}$ then. As a result, the duty cycle of the switch 21 smoothly increases from 0% to 100% with the increase of the voltage reference signal $V_{ref}$. When the output voltage $V_O$ substantially reaches the voltage value of the power supply $V_{IN}$, the time derivative of the voltage of the voltage reference signal $V_{ref}$ is substantially zero, and the duty cycle of the switch 21 is substantially 100%. Accordingly, the current flowing through the inductor 23 is substantially zero, so there will be almost no oscillation in the buck converter when the plug process is completed.

Figure 6:
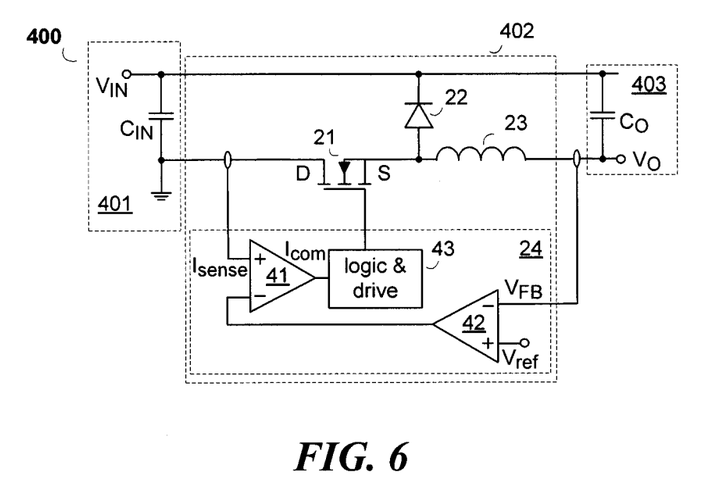
FIG. 6 illustrates a schematic circuit of a power system 400 with hot-swap with a controller 24 in accordance with an embodiment of the present disclosure.

FIG. 6 illustrates a schematic circuit of a power system 400 with a controller 24 in accordance with an embodiment of the present disclosure. In the example of FIG. 6, the controller 24 comprises: an error amplifier 42 having a first input terminal, a second input terminal and an output terminal, wherein the first input terminal is configured to receive the voltage feedback signal $V_{FB}$, the second input terminal is configured to receive a voltage reference signal $V_{ref}$, and wherein based on the voltage feedback signal $V_{FB}$ and the voltage reference signal $V_{ref}$, the error amplifier 42 generates an error amplified signal at the output terminal; a current comparator 41 having a first input terminal, a second input terminal and an output terminal, wherein the first input terminal is configured to receive the current sense signal $I_{sense}$ indicative of the current flowing through the switch 21, the second input terminal is coupled to the error amplifier 42 to receive the error amplified signal, and wherein based on the current sense signal $I_{sense}$ and the error amplified signal, the current comparator 41 generates a current comparison signal $I_{com}$ at the output terminal; and a logic and drive unit 43 coupled to the output terminal of the current comparator 41 to receive the current comparison signal $I_{com}$, and to generate the switch control signal at the output terminal to control the switch 21 to operate at ON/OFF state based thereupon.

Several embodiments of the power system discussed above are configured to be close-loop control with the voltage feedback signal and the voltage reference signal in the plugging process. However, one skilled in the art should realize that the power system may be configured to be open-loop control in the plugging process, as shown in FIG. 7.

Figure 7:
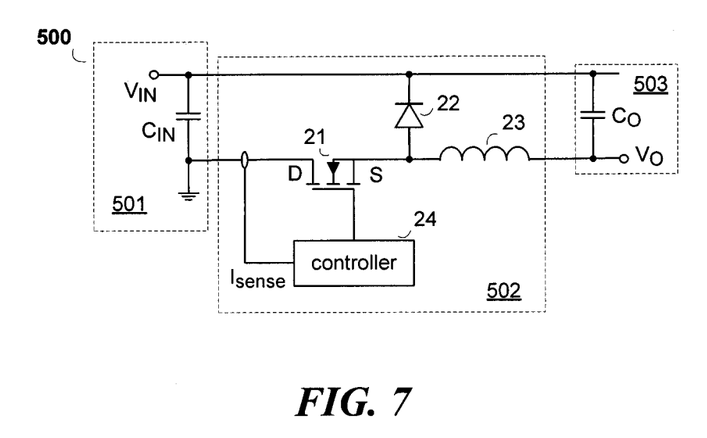
FIG. 7 illustrates a schematic circuit of a power system 500 with hot-swap in accordance with an embodiment of the present disclosure.

FIG. 7 illustrates a schematic circuit of a power system 500 with hot-swap in accordance with an embodiment of the present disclosure. As shown in FIG. 7, the controller 24 receives the current sense signal indicative of the current flowing through the switch 21, and generates the switch control signal thereupon to implement over current control. In the example of FIG. 7, the switch 21 has a duty cycle that gradually increases from 0% to 100%; and the duty cycle keeps 100% after the plugging process is completed.

Ideally, after the plugging process is completed, there is no resistance in the inductor 23, so the inductor 23 consumes no power. But this is not always the case in real world conditions. The inductor 23 may has parasitic resistors, which consume power in the normal operation of the power system.

Figure 8:
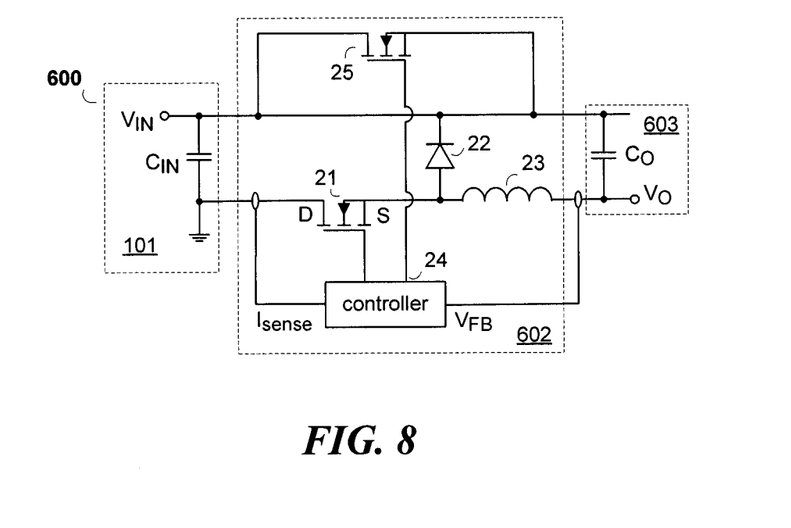
FIG. 8 illustrates a schematic circuit of a power system 600 with hot-swap in accordance with an embodiment of the present disclosure.

FIG. 8 illustrates a schematic circuit of a power system 600 with hot-swap in accordance with an embodiment of the present disclosure. In the example of FIG. 8, the power system 600 further comprises a second switch 25 coupled in parallel with the buck converter in the hot-swap stage 602.

In one embodiment, during the plugging of the power system, the switch 21 is controlled to operate at ON/OFF state to deliver power supply to the load stage, while the second switch 25 is controlled to be OFF; and after the plugging process is completed, the switch 21 is controlled to be OFF, while the second switch 25 is controlled to be ON with a 100% duty cycle.

In one embodiment, during the plugging of the power system, the switch 21 is controlled to operate at ON/OFF state to deliver power supply to the load stage, while the second switch 25 is controlled to be OFF; when the plugging process is close to completion, e.g., when the switch 21 has a duty cycle near 90%, the second switch 25 is controlled to operate in LDO mode; and when the plugging process is substantially completed, the switch 21 is controlled to be OFF, while the second switch 25 is controlled to be ON with a 100% duty cycle.

In one embodiment, the second switch comprises a controllable semiconductor device, such as MOSFET, IGBT, BJT, and etc. . . .

Figure 9:
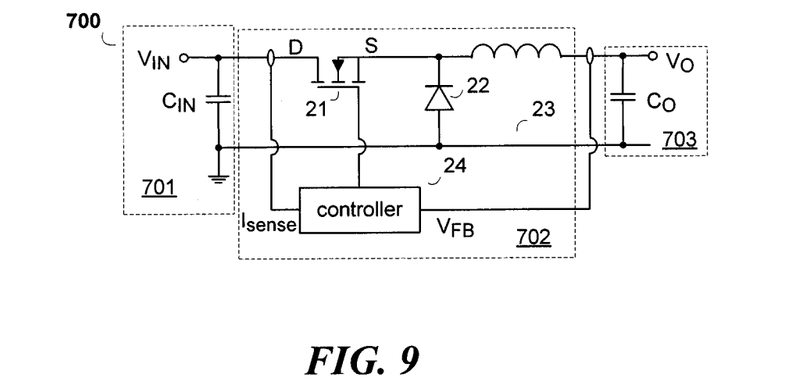
FIG. 9 illustrates a schematic circuit of a power system 700 with hot-swap in accordance with an embodiment of the present disclosure.

Several embodiments of the power system discussed above are configured in low-side, but one skilled in the art should realize that the power system could also be configured in high-side. FIG. 9 illustrates a schematic circuit of a power system 700 with hot-swap in accordance with an embodiment of the present disclosure.

In the example of FIG. 9, the power system 700 comprises: a front stage 701 having an output terminal configured to provide a constant power supply $V_{IN}$, wherein the front stage 701 having a front capacitor $C_{IN}$ coupled between the output terminal and a reference ground; a hot-swap stage 702 coupled to the output terminal of the front stage 701 to receive the power supply $V_{IN}$, and to generate an output voltage $V_O$ based thereupon, wherein the hot-swap stage 702 comprises: a switch 21 having a first terminal, a second terminal and a control terminal, wherein the first terminal is coupled to the output terminal of the front stage 701 to receive the power supply $V_{IN}$; a diode 22 coupled between the second terminal of the switch 21 and the reference ground; an inductor 23 having a first terminal and a second terminal, wherein the first terminal is coupled to the second terminal of the switch 21, and wherein the output voltage $V_O$ is provided at the second terminal of the inductor 23; and a controller 24 having a first input terminal, a second input terminal, and an output terminal, wherein the first input terminal is configured to receive a current sense signal $I_{sense}$ indicative of a current flowing through the switch 21, the second input terminal is configured to receive a voltage feedback $V_{FB}$ signal indicative of the output voltage $V_O$, and based on the current sense signal $I_{sense}$ and the voltage feedback signal $V_{FB}$, the controller 24 generates a switch control signal to the control terminal of the switch 21 at its output terminal, to control the switch 21 to operate at ON/OFF state, and wherein the hot-swap stage 702 generates the output voltage with desired voltage value based on the ON/OFF operation of the switch 21; and a load stage 703 coupled to the hot-swap stage 702 to receive the output voltage $V_O$. In one embodiment, the desired output voltage value is substantially equal to the voltage value of the power supply $V_{IN}$.

Several embodiments of the foregoing power system provide hot swapping by a buck converter with lower power loss compared to conventional technique discussed above. Unlike the conventional technique, several embodiments of the foregoing power system adopt a switch operating at switch mode instead of LDO mode, which highly reduces the power loss during start-up and optimizes the thermal design. Furthermore, several embodiments of the foregoing power system control the output voltage to smoothly increase, so that the time derivative of the output voltage is substantially zero when the output voltage reaches the input voltage value, which eliminates oscillation in the hot-swap stage.

Figure 10:
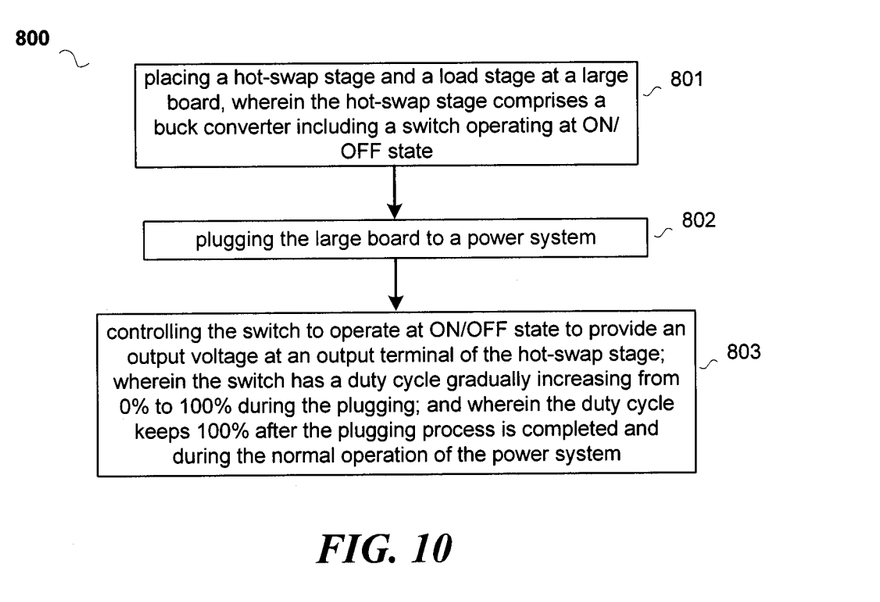
FIG. 10 schematically shows a flowchart 800 of a method for hot swapping in accordance with an embodiment of the present disclosure.

FIG. 10 schematically shows a flowchart 800 of a method for hot swapping in accordance with an embodiment of the present disclosure. The method comprises:

Step 801, placing a hot-swap stage and a load stage at a board, wherein the hot-swap stage comprises a buck converter including a switch operating at ON/OFF state.

Step 802, plugging the board to a power system. And

Step 803, controlling the switch operate at ON/OFF state to provide an output voltage at an output terminal of the hot-swap stage; wherein the switch has a duty cycle gradually increasing from 0% to 100% during the plugging; and wherein the duty cycle keeps 100% after the plugging process is completed and during the normal operation of the power system.

In one embodiment, controlling the switch to operate at ON/OFF state in response to a current flowing through the switch, the output voltage and a voltage reference signal. In one embodiment, the voltage reference signal has a linear slew rate at beginning and an exponential ramping slew rate from a certain time point.

In one embodiment, controlling the switch operate at ON/OFF state in response to a current flowing through the switch, a current reference signal, the output voltage and a voltage reference signal.

In one embodiment, the method further comprises shorting the hot-swap stage by a second switch operating at ON state with 100 duty cycle after the plugging process is completed.

This written description uses examples to disclose the disclosure, including the best mode, and also to enable a person skilled in the art to make and use the disclosure. The patentable scope of the disclosure may include other examples that occur to those skilled in the art.

We claim:

1. A power system with hot-swap, comprising:
   a front stage having an output terminal configured to provide a constant power supply, wherein the front stage having a front capacitor coupled between the output terminal and a reference ground;
   a hot-swap stage coupled to the output terminal of the front stage to receive the power supply, and to generate an output voltage based thereupon; wherein the hot-swap stage comprises: a buck converter having a switch; and a controller having a first input terminal, a second input terminal, and an output terminal, wherein the first input terminal is configured to receive a current sense signal indicative of a current flowing through the switch, the second input terminal is configured to receive a voltage feedback signal indicative of the output voltage, and wherein based on the current sense signal and the voltage feedback signal, the controller generates a switch control signal at the output terminal, to control the switch to operate at ON/OFF state, and wherein the hot-swap stage generates the output voltage with desired voltage value based on the ON/OFF operation of the switch; and
   a load stage coupled to the hot-swap stage to receive the output voltage.

2. The power system of claim 1, wherein the buck converter further comprises:
   a diode coupled to the switch; and
   an inductor having a first terminal and a second terminal, wherein the first terminal is coupled to the conjunction of the switch and the diode, wherein the output voltage is provided at the second terminal of the inductor.

3. The power system of claim 1, wherein the load stage comprises at least one of the following loads:
   telecom line cards, network switches/routers, central-office line cards, server line cards, and base-station line cards.

4. The power system of claim 1, wherein the controller comprises:
   a current comparator having a first input terminal, a second input terminal and an output terminal, wherein the first input terminal is configured to receive the current sense signal indicative of the current flowing through the switch, the second input terminal is configured to receive a current reference signal, and wherein based on the current sense signal and the current reference signal, the current comparator generates a current comparison signal at the output terminal;
   an error amplifier having a first input terminal, a second input terminal and an output terminal, wherein the first input terminal is configured to receive the voltage feedback signal, the second input terminal is configured to receive a voltage reference signal, and wherein based on the voltage feedback signal and the voltage reference signal, the error amplifier generates an error amplified signal at the output terminal; and
   a logic and drive unit having a first input terminal, a second input terminal, and an output terminal, wherein the first input terminal is coupled to the output terminal of the current comparator to receive the current comparison signal, the second input terminal is coupled to the output terminal of the error amplifier to receive the error amplified signal, and wherein based on the current comparison signal and the error amplified signal, the logic and drive unit generates the switch control signal at the output terminal.

5. The power system of claim 4, wherein the voltage reference signal is variable, and wherein the time derivative of the voltage reference signal is substantially zero when the output voltage substantially reaches the voltage value of the power supply.

6. The power system of claim 1, wherein the controller comprises:
   a current comparator having a first input terminal, a second input terminal and an output terminal, wherein the first input terminal is configured to receive the current sense signal, the second input terminal is configured to receive a current reference signal, and wherein based on the current sense signal and the current reference signal, the current comparator generates a current comparison signal at the output terminal;
   a voltage reference generator having an output terminal configured to provide a voltage reference signal having a linear slew rate at beginning and an exponential ramping slew rate from a certain time point;
   an error amplifier having a first input terminal, a second input terminal and an output terminal, wherein the first input terminal is configured to receive the voltage feedback signal, the second input terminal is coupled to the output terminal of the voltage reference generator to receive the voltage reference signal, and wherein based on the voltage feedback signal and the voltage reference signal, the error amplifier generates an error amplified signal at the output terminal; and
   a logic and drive unit having a first input terminal, a second input terminal, and an output terminal, wherein the first input terminal is coupled to the output terminal of the current comparator to receive the current comparison signal, the second input terminal is coupled to the output terminal of the error amplifier to receive the error amplified signal, and wherein based on the current comparison signal and the error amplified signal, the logic and drive unit generates the switch control signal at the output terminal.

7. The power system of claim 6, wherein the voltage reference generator comprises:
   an exponential signal generator having an output terminal configured to generate an exponential signal with exponential ramping slew rate;
   a linear signal generator having an output terminal configured to generate a linear signal with linear slew rate; and
   a selector having a first input terminal, a second input terminal and an output terminal, wherein the first input terminal is coupled to the output terminal of the exponential signal generator to receive the exponential signal, the second input terminal is coupled to the output terminal of the linear signal generator to receive the linear signal, and wherein based on the exponential signal and the linear signal, the selector selects the one with lower voltage value as the voltage reference signal at the output terminal.

8. The power supply of claim 7, wherein the exponential signal generator comprises:
   a first capacitor coupled between the output terminal of the exponential signal generator and the reference ground;
   a voltage source and a resistor coupled in series between the output terminal of the exponential signal generator and the reference ground.

9. The power system of claim 1, wherein the controller comprises:

an error amplifier having a first input terminal, a second input terminal and an output terminal, wherein the first input terminal is configured to receive the voltage feedback signal, the second input terminal is configured to receive a voltage reference signal, and wherein based on the voltage feedback signal and the voltage reference signal, the error amplifier generates an error amplified signal at the output terminal;

a current comparator having a first input terminal, a second input terminal and an output terminal, wherein the first input terminal is configured to receive the current sense signal indicative of the current flowing through the switch, the second input terminal is coupled to the error amplifier to receive the error amplified signal, and wherein based on the current sense signal and the error amplified signal, the current comparator generates a current comparison signal at the output terminal; and a logic and drive unit coupled to the output terminal of the current comparator to receive the current comparison signal, and to generate the switch control signal at the output terminal.

10. The power system of claim 1, wherein the controller receives the current sense signal indicative of the current flowing through the switch, and generates the switch control signal based thereupon, wherein the switch has a duty cycle that gradually increases from 0% to 100%; and the duty cycle keeps 100% after the plugging process is completed.

11. The power system of claim 1, further comprising a second switch coupled in parallel with the buck converter in the hot-swap stage, wherein
during the plugging of the power system, the switch is controlled to operate at ON/OFF state to deliver power supply to the load stage, while the second switch is controlled to be OFF; and
after the plugging process is completed, the switch is controlled to be OFF, while the second switch has a 100% duty cycle.

12. The power system of claim 1, further comprising a second switch coupled in parallel with the buck converter in the hot-swap stage, wherein
during the plugging of the power system, the switch is controlled to operate at ON/OFF state to deliver power supply to the load stage, while the second switch is controlled to be OFF;
when the plugging process is close to completion, the second switch is controlled to operate in LDO mode; and
when the plugging process is substantially completed, the switch is controlled to be OFF, while the second switch has a 100% duty cycle.

13. A power supply with hot-swap, comprising:
a front stage having an output terminal configured to provide a constant power supply, wherein the front stage having a front capacitor coupled between the output terminal and a reference ground;
a hot-swap stage coupled to the output terminal of the front stage to receive the power supply, and to generate an output voltage based thereupon; wherein the hot-swap stage comprises: a switch having a first terminal, a second terminal and a control terminal, wherein the first terminal is coupled to the output terminal of the front stage to receive the power supply; a diode coupled between the second terminal of the switch and the reference ground; an inductor having a first terminal and a second terminal, wherein the first terminal is coupled to the second terminal of the switch, and wherein the output voltage is provided at the second terminal of the inductor; and a controller having a first input terminal, a second input terminal, and an output terminal, wherein the first input terminal is configured to receive a current sense signal indicative of a current flowing through the switch, the second input terminal is configured to receive a voltage feedback signal indicative of the output voltage, and based on the current sense signal and the voltage feedback signal, the controller generates a switch control signal to the control terminal of the switch at its output terminal, to control the switch to operate at ON/OFF state, and wherein the hot-swap stage generates the output voltage with desired voltage value based on the ON/OFF operation of the switch; and a load stage coupled to the hot-swap stage to receive the output voltage.

14. The power system of claim 13, further comprising a second switch coupled in parallel with the buck converter in the hot-swap stage, wherein
during the plugging of the power system, the switch is controlled to operate at ON/OFF state to deliver power supply to the load stage, while the second switch is controlled to be OFF; and
after the plugging process is completed, the switch is controlled to be OFF, while the second switch has a 100% duty cycle.

15. The power system of claim 13, further comprising a second switch coupled in parallel with the buck converter in the hot-swap stage, wherein
during the plugging of the power system, the switch is controlled to operate at ON/OFF state to deliver power supply to the load stage, while the second switch is controlled to be OFF;
when the plugging process is close to completion, the second switch is controlled to operate in LDO mode; and
when the plugging process is substantially completed, the switch is controlled to be OFF, while the second switch has a 100% duty cycle.

16. The power system of claim 13, wherein the controller comprises:
a current comparator having a first input terminal, a second input terminal and an output terminal, wherein the first input terminal is configured to receive the current sense signal indicative of the current flowing through the switch, the second input terminal is configured to receive a current reference signal, and wherein based on the current sense signal and the current reference signal, the current comparator generates a current comparison signal at the output terminal;
an error amplifier having a first input terminal, a second input terminal and an output terminal, wherein the first input terminal is configured to receive the voltage feedback signal, the second input terminal is configured to receive a voltage reference signal, and wherein based on the voltage feedback signal and the voltage reference signal, the error amplifier generates an error amplified signal at the output terminal; and
a logic and drive unit having a first input terminal, a second input terminal, and an output terminal, wherein the first input terminal is coupled to the output terminal of the current comparator to receive the current comparison signal, the second input terminal is coupled to the output terminal of the error amplifier to receive the error amplified signal, and wherein based on the current comparison signal and the error amplified signal, the logic and drive unit generates the switch control signal at the output terminal; wherein
the voltage reference signal is variable, and wherein the time derivative of the voltage reference signal is substantially zero when the output voltage substantially reaches the voltage value of the power supply.

17. A method for hot swapping, comprising:

placing a hot-swap stage and a load stage at a board, wherein the hot-swap stage comprises a buck converter including a switch operating at ON/OFF state;

plugging the board to a power system;

controlling the switch operate at ON/OFF state to provide an output voltage at an output terminal of the hot-swap stage; wherein the switch has a duty cycle gradually increasing from 0% to 100% during the plugging; and wherein the duty cycle keeps 100% after the plugging process is completed and during the normal operation of the power system.

18. The method of claim 17, wherein controlling the switch to operate at ON/OFF state in response to a current flowing through the switch, the output voltage and a voltage reference signal.

19. The method of claim 18, wherein the voltage reference signal has a linear slew rate at beginning and an exponential ramping slew rate from a certain time point.

20. The method of claim 17, further comprising shorting the hot-swap stage by a second switch operating at ON state with 100 duty cycle after the plugging process is completed.

* * * * *